(12) United States Patent
Sato

(10) Patent No.: US 9,744,470 B2
(45) Date of Patent: Aug. 29, 2017

(54) DISTRIBUTED FEEDING DEVICE AND CONTROL SYSTEM OF MODEL VEHICLE

(71) Applicant: TOMY TEC CO., LTD., Tochigi (JP)

(72) Inventor: Morio Sato, Machida (JP)

(73) Assignee: TOMY TEC CO., LTD., Tochigi (JP)

( * ) Notice: Subject to any disclaimer, the term of this patent is extended or adjusted under 35 U.S.C. 154(b) by 0 days.

(21) Appl. No.: 15/135,642

(22) Filed: Apr. 22, 2016

(65) Prior Publication Data

US 2016/0310859 A1 Oct. 27, 2016

(30) Foreign Application Priority Data

Apr. 23, 2015 (JP) .................................. 2015-088193

(51) Int. Cl.
*G06F 17/00* (2006.01)
*A63H 19/24* (2006.01)
(Continued)

(52) U.S. Cl.
CPC .............. *A63H 19/24* (2013.01); *A63H 19/10* (2013.01); *G06F 1/06* (2013.01); *G06F 1/12* (2013.01)

(58) Field of Classification Search
CPC ........ A63H 33/22; A63H 33/26; A63H 30/02; A63H 30/04; A63H 30/06; A63H 19/24; A63H 19/02; A63H 18/10; A63H 18/14; A63H 18/16; A63H 19/10; G06F 1/06; G06F 1/12
(Continued)

(56) References Cited

U.S. PATENT DOCUMENTS 7,106,989 B2 * 9/2006 Eom .................. G03G 15/5004
399/88
7,378,889 B2 * 5/2008 Wu .................... H02M 3/33507
327/175
(Continued)

FOREIGN PATENT DOCUMENTS

CN 202289457 7/2012
DE 3421460 * 12/1985
(Continued)

OTHER PUBLICATIONS

Espacenet Abstract of JP 2003225472 published Aug. 12, 2003.
(Continued)

*Primary Examiner* — Muhammad Shafi
(74) *Attorney, Agent, or Firm* — Staas & Halsey LLP

(57) ABSTRACT

To suppress unintended rapid acceleration of a vehicle and the like while suppressing a wire length of a feeding system in the entire layout in section-divided feed using pulse width modulation. A clock generation unit included in a feeding device generates an internal clock having a phase aligned based on a reset signal supplied from a higher-level device that controls a vehicle speed of the vehicle, the reset signal being commonly supplied to another feeding device. A pulse width modulation unit counts the internal clock, and generates a pulse having a pulse width (duty ratio) according to an instruction of the vehicle speed from the higher-level device based on the count value. A driver supplies a pulsed drive voltage having the duty ratio, to which the pulse width modulation has been applied by the pulse width modulation unit, to a section allocated to the driver.

8 Claims, 8 Drawing Sheets

(51) Int. Cl.
*A63H 19/10* (2006.01)
*G06F 1/06* (2006.01)
*G06F 1/12* (2006.01)

(58) Field of Classification Search
USPC .......................................................... 701/20
See application file for complete search history.

(56) References Cited

U.S. PATENT DOCUMENTS

| | | | | |
|---|---|---|---|---|
| 8,098,265 | B2* | 1/2012 | El-Ghoroury | H04N 9/3155 345/589 |
| 9,363,069 | B2* | 6/2016 | Wang | G06F 1/08 |
| 2004/0010356 | A1 | 1/2004 | Lenz | |
| 2005/0031369 | A1* | 2/2005 | Eom | G03G 15/5004 399/88 |
| 2015/0002488 | A1* | 1/2015 | Hwang | G09G 3/00 345/204 |

FOREIGN PATENT DOCUMENTS

| | | |
|---|---|---|
| JP | 3-26636 | 4/1991 |
| JP | 2003-225472 | 8/2003 |
| JP | 2006-43384 | 2/2006 |
| JP | 2008-48935 | 3/2008 |
| JP | 2010-252955 | 11/2010 |

OTHER PUBLICATIONS

Espacenet Abstract of JP 2010252955 published Nov. 11, 2010.
Espacenet Abstract of JP 2008048935 published Mar. 6, 2008.
Abstract of KOKOKU (JP Examined Patent Publication) No. H03-26636.
Espacenet Abstract of JP 2006043384 published Feb. 16, 2006.
Japanese Patent Office Action dated Jan. 25, 2016 in Application No. 2015-088193.
Japanese Patent Office Decision of Grant dated Feb. 17, 2016 in Application No. 2015-088193.
Espacenet English Abstract of CN 202289457, published Jul. 4, 2012.
Espacenet English Abstract of DE 3421460, published Dec. 12, 1985.
Extended European Search Report for corresponding European Patent Application No. 16166718.3, dated Sep. 16, 2016.

* cited by examiner

DISTRIBUTED FEEDING DEVICE AND CONTROL SYSTEM OF MODEL VEHICLE

CROSS-REFERENCE TO RELATED APPLICATION

This application is based upon and claims the benefit of priority under 35 U.S.C. §119 of Japanese Patent Application No. 2015-088193, filed Apr. 23, 2015, the contents of which are incorporated herein by reference.

BACKGROUND OF THE INVENTION

Field of the Invention

The present invention relates to a distributed feeding device that feeds power to vehicles such as railway models and a control system, and especially relates to divided feed using pulse width modulation (PWM).

Description of the Related Art

Conventionally, in layouts in which a model vehicle such as a railway model travels, control systems that cause a plurality of vehicles to travel while individually controlling the plurality of vehicles are known. As one of such control systems, a system called digital command control (DCC) is widely spread in Europe and the United States, and is also spreading in Japan. In the DCC, a decoder is mounted in a vehicle to be controlled, and a command from a controller is transmitted to the decoder at the vehicle side through a rail that configures the layout. In this command, an address is attached, and only the decoder corresponding to the specified address executes the command, so that drive of a travel motor, lighting of lights, and the like are individually controlled. An alternating current of about 12 V flows in the layout on a steady basis, and the decoder converts the alternating current into a direct current according to the command and drives a motor mounted on the vehicle, so that a vehicle speed is controlled. Although the DCC has a high degree of freedom as a control system, the decoder itself is very expensive and in addition, time-consuming machining often needs to be applied to the vehicle to mount the decoder. Further, some knowledge is required. Therefore, a barrier to introduction is high for users. Further, since the power feed to the plurality of vehicles that travel on the layout is controlled by the one feeding system, a rated current is higher than conventional direct current control (DC control), and there is concern over safety, such as electric shock or short circuit when carelessly touching the rail. From these problems, the DCC has not yet been superior to the conventional direct current control.

Even the conventionally widely spread direct current control can allow the plurality of vehicles to travel at the same time by devising the feeding system of the layout, and switching the power feed to the layout in real time according to the travel of the vehicles. For example, JP 2003-225472 A discloses a vehicle driving device that individually controls a plurality of vehicles by dividing a railway model layout into a plurality of electrically separated sections, and causing a current to flow only to a necessary section, that is, performing divided feed on a section basis. Further, this vehicle driving device prevents collision of vehicles before anything happens by performing exclusive control of not allowing a plurality of vehicles to enter a section as a destination, in addition to simple divided feeding.

Further, JP 2010-252955 A discloses a railway model automatic driving device that performs divided feed on a section basis using pulse width modulation. To be specific, a plurality of motor drivers allocated to respective sections is built in a microcomputer unit configured from a one-chip microcomputer, and pulsed drive voltages output from the respective motor drivers are supplied to a power vehicle on a rail on a section basis. One motor driver is independently configured for each section by using one channel of a 16-bit timer mounted on the one-chip microcomputer as speed control PWM waveform generating unit. Further, JP 2010-252955 A points out that, although not disclosing a specific configuration, it is necessary to adjust phases between channels because power feed from motor drives from two places is added when the power vehicle (motor-mounted vehicle) is on a boundary of sections.

As pointed out in JP 2010-252955 A, in the section-divided feed using pulse width modulation, when a vehicle traveling on the layout enters from the current section to the next section, that is, in the process where the vehicle travels across the adjacent sections, a phenomenon of rapid acceleration of the vehicle may occur against an instruction of the controller. Further, like the one-chip microcomputer (microcomputer unit) of JP 2010-252955 A, when the power feed is collectively performed from a single feed source to the sections, it is necessary to pull out a large number of wires of the feeding system from one place to all of sections including a section close to the feed source and a section distant from the feed source. Therefore, in the entire layout, a wire amount of the feeding system becomes very large. This increase in the wire amount imposes a heavy burden on a user who creates the layout. Further, a large current, which is sufficient to drive the motor mounted on the vehicle, flows in the feeding system, and a high-frequency component is included because the drive current has a pulse waveform in the case of pulse width modulation. Therefore, the wires may become a noise source that negatively affects peripheral devices. Therefore, from the perspective of suppression of unnecessary radiation, the increase in the wire amount of the feeding system is not favorable.

SUMMARY OF THE INVENTION

The present invention has been made in view of the foregoing, and an objective is to suppress unintended rapid acceleration of a vehicle caused in traveling across adjacent sections while suppressing an increase in a wire amount of a feeding system, in section-divided feed using pulse width modulation.

A first invention provides a distributed feeding device of a model vehicle that provides each of a plurality of electrically separated sections in a layout, and that is configured to feed power to the model vehicle traveling on the layout on a section basis. This first invention has a clock generation unit, a pulse width modulation unit, and a driver. The clock generation unit is configured to generate an internal clock having a phase of the clock aligned with a phase of the clock of another feeding device based on a synchronization signal supplied from a higher-level device. The synchronization signal is commonly supplied to another feeding device. The pulse width modulation unit is configured to set a pulse having a duty ratio according to an instruction from the higher-level device based on a count value obtained by counting the internal clock generated in the clock generation unit. The driver is configured to supply a pulsed drive voltage having the duty ratio set by the pulse width modulation unit to the section allocated to the driver.

In the first invention, the clock generation unit prefers to adjust the phase of the internal clock at input timing of the synchronization signal. Also the pulse width modulation unit prefers to correct the count value to a predetermined value at input timing of the synchronization signal.

In the first invention, the synchronization signal prefers to be serial data periodically supplied from the higher-level device. The synchronization signal is commonly supplied to another feeding device. In this case, the clock generation unit prefers to adjust the phase of the internal clock at input timing of the serial data when a unique address indicating the serial data is addressed to the plurality of feeding devices is attached to the serial data supplied from the higher-level device. Also the pulse width modulation unit prefers to correct the count value to a value specified by the serial data when the unique address is attached to the serial data supplied from the higher-level device.

In the first invention, the pulse width modulation unit prefers to superimpose, on the pulse, a high-frequency pulse having a frequency that is high enough not to allow a motor mounted on the model vehicle to move, according to an instruction from the higher-level device. In this case, the high-frequency pulse prefers to be internally generated by the clock generation unit, and a phase of the high-frequency pulse is aligned with a phase of the high-frequency pulse of another feeding device based on the synchronization signal.

A second invention provides a control system that controls a model vehicle traveling on a layout made of a plurality of electrically separated sections. This second invention has a plurality of position sensors, a higher-level device, a first feeding device, and a second feeding device. The plurality of position sensors are configured to detect a position of the model vehicle traveling on the layout. The higher-level device is configured to supply a synchronization signal for aligning phases of pulse width modulation to the plurality of feeding devices, and to control the travel of the model vehicle on a section basis according to the position of the model vehicle detected by the plurality of position sensors. The first feeding device includes a first clock generation unit generating a first internal clock, adjusts a phase of the first internal clock based on the synchronization signal, and supplies a pulsed drive voltage to a first section by generating a pulse having a duty ratio according to an instruction of a vehicle speed from the higher-level device based on a count value obtained by counting the first internal clock. The second feeding device includes a second clock generation unit generating a second internal clock, adjusts a phase of the second internal clock to be aligned with the first internal clock based on the synchronization signal, and supplies a pulsed drive voltage to a second section adjacent to the first section by generating a pulse having a duty ratio according to an instruction of a vehicle speed from the higher-level device based on a count value obtained by counting the second internal clock. The higher-level device allows a first model vehicle to enter the second section when a second model vehicle traveling ahead of the first model vehicle traveling in the first section does not exist in the second section. And the higher-level device stops the first model vehicle in the first section until the second model vehicle exits from the second section when the second model vehicle exists in the second section.

In the second invention, the first feeding device and the second feeding device prefer to adjust the phase of the first internal clock and the phase of the second internal clock at input timing of the synchronization signal. Also the first feeding device and the second feeding device prefer to correct the count value of the first clock generation unit and the count value of the second clock generation unit to a predetermined value at input timing of the synchronization signal.

In the second invention, the synchronization signal prefers to be serial data periodically supplied from the higher-level device to the first feeding device and the second feeding device. In this case, the first feeding device and the second feeding device prefer to adjust the phase of the first internal clock and the phase of the second internal clock at input timing of the serial data when a unique address indicating the serial data is addressed to the plurality of feeding devices is attached to the serial data. Also the first feeding device and the second feeding device prefer to correct the count value of the first clock generation unit and the count value of the second clock generation unit to a value specified by the serial data when the unique address is attached to the serial data.

In the second invention, the first feeding device and the second feeding device prefer to supply the pulsed drive voltages by superimposing, on the pulse, a high-frequency pulse having a frequency that is high enough not to allow a motor mounted on the model vehicle to move, according to an instruction from the higher-level device. In this case, the high-frequency pulses prefer to be internally generated in the first feeding device and the second feeding device, respectively, and phases of the high-frequency pulses are aligned between the first feeding device and the second feeding device based on the synchronization signal.

According to the first and second inventions, phases of internal clocks, which are to serve as a base clock of pulse width modulation, are aligned among a plurality of feeding devices based on a synchronization signal supplied from a higher-level device. Accordingly, even if drive voltages supplied from a plurality of sections are superimposed at a model vehicle side, a duty ratio thereof is not changed. Therefore, unintended rapid acceleration and the like of the model vehicle can be effectively suppressed. Further, power feed is distributed among a plurality of feeding devices, whereby a wire amount of a feeding system in the entire layout can be effectively suppressed, compared with a case of a single feed source.

DETAILED DESCRIPTION OF THE PREFERRED EMBODIMENTS

First Embodiment

Figure 1:
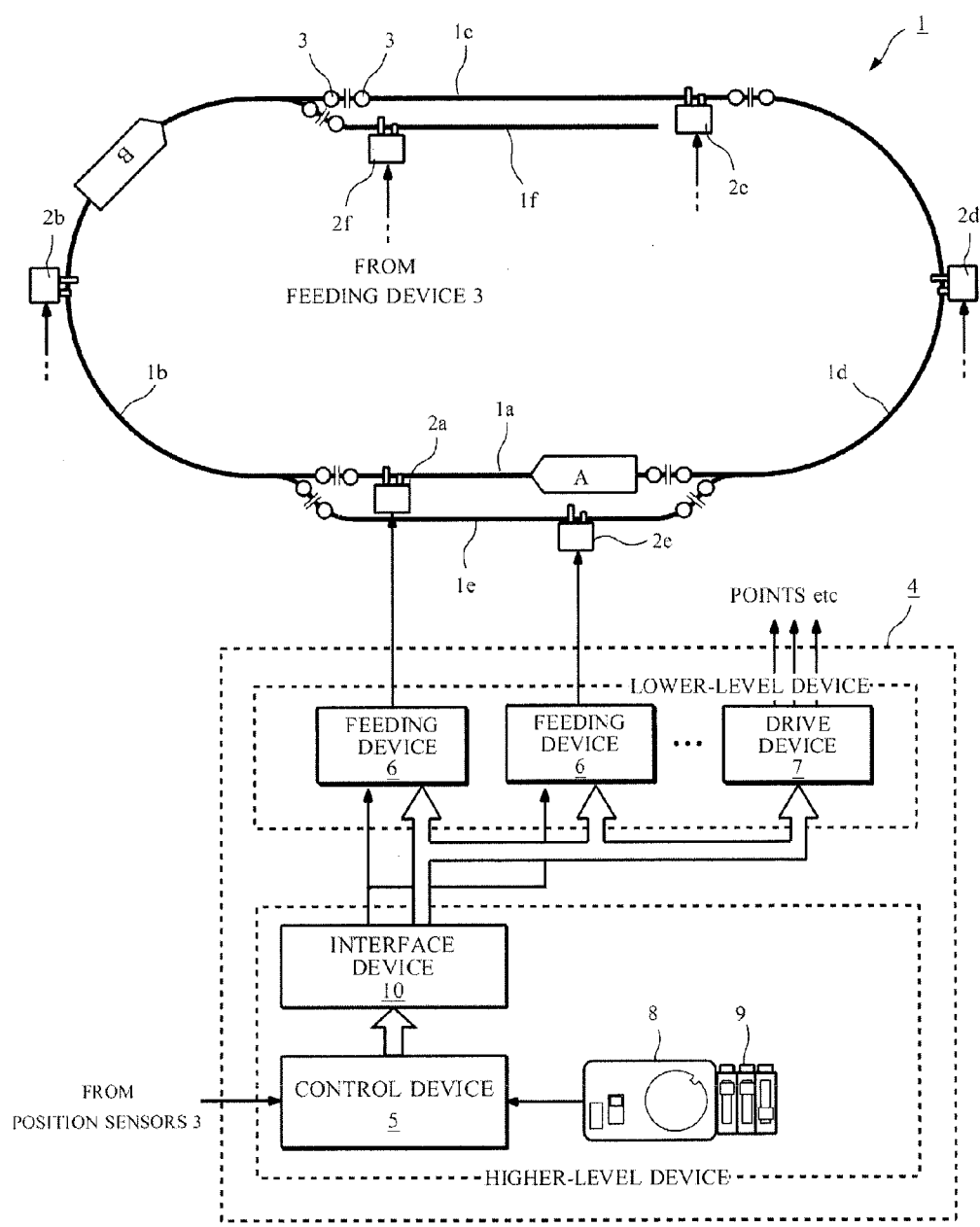
FIG. 1 is an entire configuration diagram of a model vehicle control system.

FIG. 1 is an entire configuration diagram of a railway model control system. A layout 1 on which a plurality of vehicles including vehicles A and B is configured from a combination of a plurality of rails such as straight rails, curved rails, and points. Basically, a conductive connecting member called joint is used for connection between rails, and the rails electrically connected with the joint form a continuous same section. Further, an insulating connecting member called gap is used for connection between some of rails, and the rails electrically separated with the gap form mutually separated sections. In the example illustrated in FIG. 1, by providing the gaps in seven places in the layout 1, the layout 1 is divided into electrically separated six sections 1a to 1f, that is, the four sections 1a to 1d that configure an endless, the section 1e corresponding to a refuge track of double track platform, and the section 1f corresponding to an incoming line branching from the endless. In such a layout 1, respective lengths of the sections 1a to 1f are, in principle, larger than the maximum length of the vehicles that are supposed to travel on the layout 1, and are favorably lengths that sufficiently anticipate excessive travel when causing a traveling vehicle to stop. Note that, in the present specification, the "vehicle" refers to one collective traveling unit in terms of control, and includes not only one vehicle (power vehicle) but also a train organized from a plurality of vehicles (the train may include a plurality of power vehicles). Further, a plurality of vehicles that travels together while maintaining an extremely close state, although not physically coupled with one another, is also considered as one "vehicle" as long as the plurality of vehicles is the one collective traveling unit.

In each of the sections 1a to 1f, any of feeders 2a to 2f is attached to a connector portion where electrical connection to the rails is performed. Further, position sensors 3 that detect the position of the vehicle are provided to face each other across the gap, near end portions of the respective sections 1a to 1f. As the position sensor 3, for example, an optical sensor that detects existence of reflection of light associated with passage of the vehicle, a contact sensor that detects existence of contact of wheels equipped to the vehicle, a magnetic sensor that detects a magnet mounted on the vehicle, or a radio frequency identification (RFID) can be used. Further, the existence of the vehicle in the section may be detected by monitoring change of a current flowing in the rails for each section. Position information detected by the position sensor 3 is input to a control device 5 that configures a part of a control system 4 described below. The reason to arrange the pair of position sensors 3 across the gap is mainly to easily recognize a traveling direction of the vehicle from a temporal order to detect the vehicle. However, the position sensors 3 are not necessarily arranged as a pair as long as the traveling direction can be recognized by another means. Further, any type, number, and installation form of the position sensor 3 can be employed as long as the position sensor 3 can detect the position of the vehicle on the layout 1.

Figure 2A:
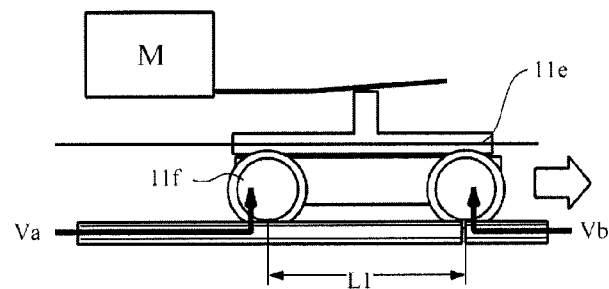
FIG. 2A is a diagram illustrating a current-collecting structure that collects a current from one of bogies of a vehicle.
Figure 2B:
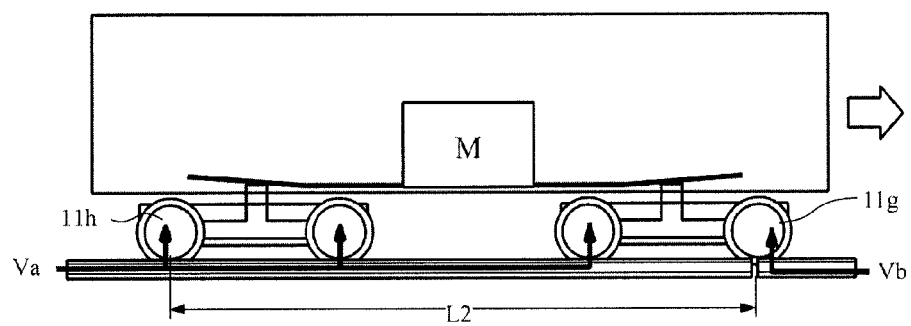
FIG. 2B is a diagram illustrating a current-collecting structure that collects currents from both of bogies of a vehicle.
Figure 2C:
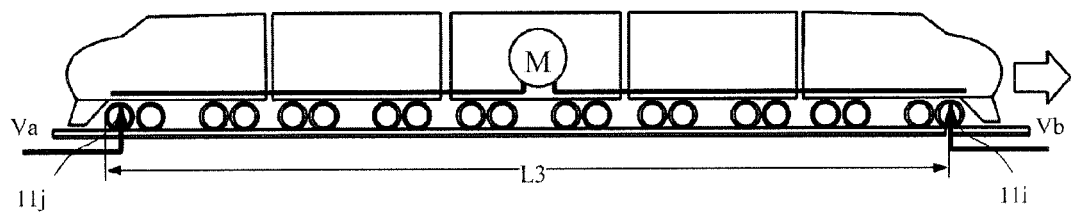
FIG. 2C is a diagram illustrating a current-collecting structure that collects currents from all of bogies of a train.

The vehicles A and B travel by themselves by collecting a current from the rails through metal-made wheels to drive motors, and transmitting drive force to the wheels. Most of the vehicles including commercially available vehicles collect the current from the rails through a plurality of wheels attached to the vehicles. For example, there are a configuration to collect the current from one of bogies (normally having two wheels) of the vehicle as illustrated in FIG. 2A, a configuration to collect the current from both of bogies (normally having four wheels) as illustrated in FIG. 2B, a configuration to collect the current from all of bogies of a train as illustrated in FIG. 2C, and the like. The reason to secure the plurality of current-collecting paths from an outside at the vehicle side using the plurality of wheels is to enhance current-collecting performance of the vehicle and achieve improvement of travel stability. Note that many of commercialized power vehicles (motor-mounted vehicles) usually support both of a system to variably set a direct current voltage value itself and a pulse width modulation system. Therefore, it is not necessarily to apply special machining to the vehicle like DCC.

Referring back to FIG. 1, the control system 4 connected to the layout 1 through wires is mainly configured from the control device 5, a plurality of feeding devices 6, a drive device 7, a controller 8, a point switch 9, and an interface device 10. The control device 5 is configured from a computer and the like, and collectively performs various types of control such as vehicle speed control of the vehicles A and B on the layout 1, lighting control of headlight and indoor light, and switching of the points. Each of the feeding devices 6 generates a drive voltage having a pulse width (duty ratio) according to an instruction from the control device 5, and outputs the drive voltage to a section allocated to the feeding device 6 itself. In the layout 1 exemplarily illustrated in FIG. 1, power feed to the layout 1 is performed in a distributed manner using the six feeding devices 6 respectively corresponding to the six sections 1a to 1f. Note that, in FIG. 1, the plurality of feeding devices 6 is aligned side by side and illustrated for convenience. However, in reality, the feeding devices 6 are arranged in a distributed manner near the respective sections to decrease the wire amount of the feeding system. The drive device 7 performs switching of the points in the layout 1 according to the instruction from the control device 5. Further, various types of control devices and accessories such as a turntable, a crossing, and a signal may be operated using the drive device 7. The controller 8 is used to control the vehicle speed and the traveling direction when causing the vehicle to travel by manual operation. Further, the point switch 9 is used to perform switching of the points in this manual drive.

The interface device 10 deals with transfer of signals between the control device 5, and the plurality of feeding devices 6 or the drive device 7. For example, processing of packetizing the instruction of the control device 5, and transmitting the packetized instruction to a lower-level device as serial data is performed by the interface device 10. Although details will be described below, processing of commonly supplying a synchronization signal (reset signal RS) for aligning phases of pulse width modulation among the plurality of feeding devices 6 to the plurality of feeding devices 6 is also performed by the interface device 10.

The higher-level devices (the control device 5 and the interface device 10) and the lower-level devices (the feeding devices 6 and the drive device 7) are connected with wires.

In the present embodiment, the interface device 10 and the lower-level devices are serial-connected (cascade-connected) to reduce the number of cables, and serial data communication is performed between the interface device 10 and the lower-level devices. This communication is sufficient as long as the communication can realize at least transmission of commands from the higher-level devices to the lower-level devices, and may therefore be unidirectional communication. However, bidirectional communication may be employed, and reception confirmation of the commands may be returned from the lower-level devices to the higher-level devices. Accordingly, communication accuracy is enhanced, and more reliable control can be performed. Note that the transfer of data between the higher-level devices and the lower-level devices is not limited to the serial data communication except a third embodiment described below, and an arbitrary data communication system can be employed trough an arbitrary communication medium such as wired means, wireless means or light.

Figure 3:
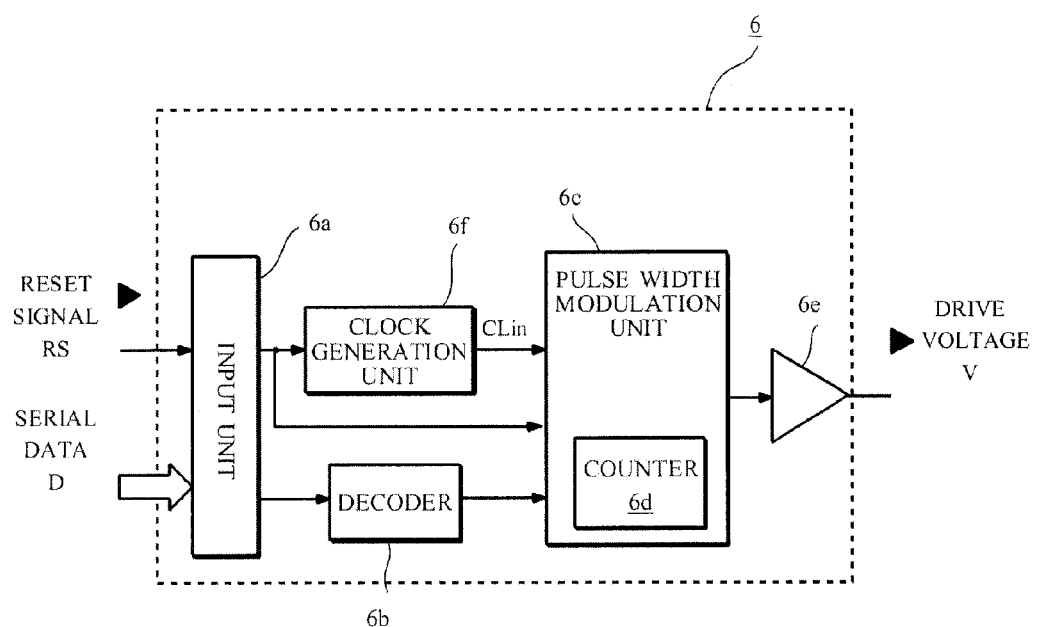
FIG. 3 is a block configuration diagram of a feeding device according to a first embodiment.

FIG. 3 is a block configuration diagram of the feeding device 6 according to the first embodiment. This feeding device 6 is mainly configured from an input unit 6a, a decoder 6b, a pulse width modulation unit 6c, a driver 6e, and a clock generation unit 6f. Serial data D and the reset signal RS as the synchronization signal supplied from the higher-level device are input to the input unit 6a. The reset signal RS is a one-shot pulse commonly supplied to all of the feeding devices 6 at the same timing. The serial data D is configured from an address unique to each decoder 6b and a command to be executed (an instruction of the vehicle speed, or the like). The decoder 6b compares the address attached to the serial data D and an own address stored in a memory included in the feeding device 6, and determines whether the serial data D is addressed to the decoder 6b itself. When the serial data D is determined to be addressed to the decoder 6b itself, the vehicle speed (vehicle speed information) instructed with the serial data D is newly written in the memory. This vehicle speed information is defined as a target count value of a pulse width modulation counter 6d described below, in other words, a pulse width (target duty ratio) of a drive voltage to be set. Meanwhile, when the serial data D is determined not to be addressed to the decoder 6b itself, the vehicle speed information of the serial data D is ignored and is not written to the memory. The setting/output of the drive voltage in the feeding device 6 is performed for each modulation period of the pulse width modulation by repeatedly reading the vehicle speed information stored in the memory. To constantly maintain the vehicle speed including stopping, it is not necessary to update the vehicle speed information in the memory, and it is sufficient to update the vehicle speed information in the memory by supplying the serial data D from the higher-level device only in a case of changing the vehicle speed.

The clock generation unit 6f generates an internal clock CLin. A phase of this internal clock CLin is aligned with phases of clocks of other feeding devices 6 at input timing of the reset signal RS. The pulse width modulation unit 6c includes the pulse width modulation counter 6d, and variably sets the duty ratio of the pulse according to the instruction of the vehicle speed from the higher-level device. To be specific, rising of the internal clock CLin is counted with the counter 6d, and a pulse having a pulse width (duty ratio) according to the instruction from the higher-level device is generated based on the count value.

The driver 6e outputs a pulsed drive voltage V having the duty ratio set by the pulse width modulation unit 6c to the section allocated to the driver 6e itself. This drive voltage V is supplied to the rails of a specific section of the sections 1a to 1f through a specific feeder of the feeders 2a to 2f, and travel of the vehicle is individually controlled on a section basis, accordingly. Note that one feeding device 6 needs to feed power to at least one section, and thus includes at least one drive voltage generating system. However, a plurality of drive voltage generating systems may be provided in consideration of extensibility, the cost, and the like.

Figure 4:
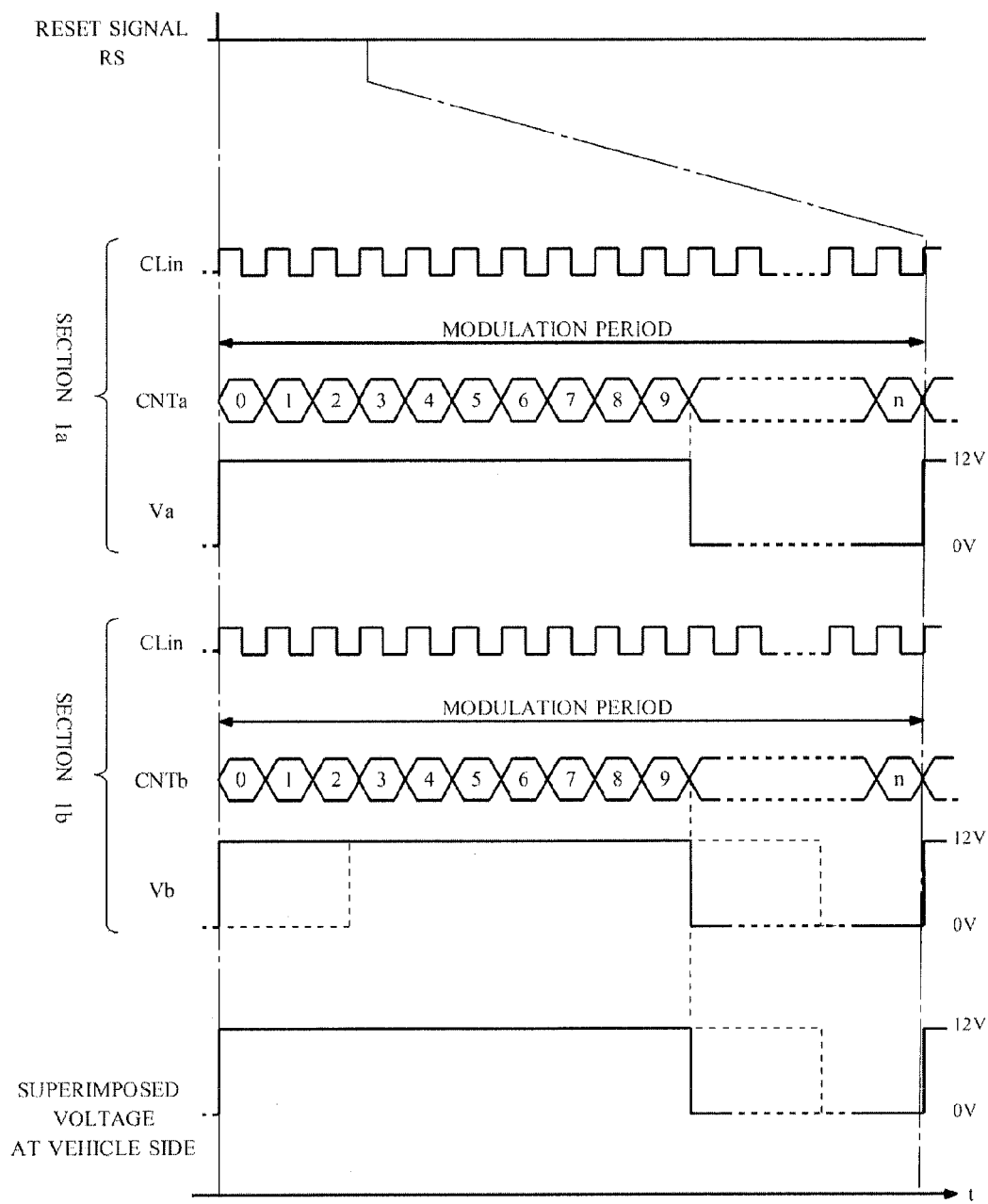
FIG. 4 is an operation timing diagram of pulse width modulation according to the first embodiment.

FIG. 4 is an operation timing diagram of the pulse width modulation according to the first embodiment. Hereinafter, a case in which the vehicle travels from the section 1a toward the section 1b illustrated in FIG. 1 will be exemplarily described. Further, the suffix a of the sign represents that the element denoted therewith is for the section 1a, and the suffix b represents that the element denoted with the suffix b is for the section 1b.

As an operation of the pulse width modulation, first, the target count value (as an example, "9") is read out from the memory. Next, count values CNTa and CNTb of the counters 6d are sequentially incremented every time the internal clock CLin rises, starting from "0" (start of the modulation period). The pulse is set ON until the count values CNTa and CNTb reach the target count value "9", and is switched to OFF at the time when the count values CNTa and CNTb have reached the target count value "9". After that, the OFF state is continued until when the count values reach "n" (end of the modulation period). Accordingly, pulse waveforms having a duty ratio corresponding to the target count value "9" are generated and output as drive voltages Va and Vb, to which the pulse width modulation has been applied. The above operation is repeated in each modulation period.

Between the feeding device 6 and another feeding device 6, the phases of the pulse width modulation are aligned based on the reset signal RS commonly supplied from the higher-level device to the feeding device 6 and the another feeding device 6. To be specific, although the two counters 6d of the sections 1a and 1b count the internal clocks CLin generated in the respective feeding devices 6 independently of each other, the internal clocks CLin may have shift due to accumulation of errors of the clocks or an influence of turbulence such as noises. The internal clock CLin defines a phase of the pulse width modulation. Therefore, this clock shift becomes phase shift of the pulse width modulation as it is. Therefore, in the present embodiment, the phases of the internal clocks CLin are adjusted at input timing of the reset signal RS, and the internal clocks CLin of the sections 1a and 1b are aligned. Accordingly, the timing to increment the count values CNTa and CNTb are matched, and thus the phases of the pulse width modulation are matched. Further, the count values CNTa and CNTb are corrected to "0" at the same timing when the reset signal RS is input. Accordingly, even if the count values CNTa and CNTb have different values due to the turbulence such as noises, the values can be corrected. As a result, the phase shift of the pulse width modulation is not caused in the sections 1a and 1b, and the drive voltages Va and Vb having a temporally matched pulse waveform are respectively supplied.

In terms of alignment of the phases of the pulse width modulation, it is favorable to frequently supply the reset signal RS. However, the interval of the supply is not necessarily constant, and may be irregular. Further, when the phases of the internal clocks CLin are adjusted, the waveform of the clock becomes discontinuous before and after the adjustment. However, an influence of the discontinuous waveform exerted on the travel of the vehicle is small. Therefore, even if the phase alignment is highly frequently performed, no big problem is caused.

In a case where a vehicle including a plurality of current-collecting paths like the vehicle that collects the current from the plurality of wheels, which is in contact with the rails, travels across the current section and the next section, the drive voltages Va and Vb separately supplied to the sections 1a and 1b are superimposed at the vehicle side. For example, as illustrated in FIG. 2A, in a case of collecting the current only with one of bogies included in the vehicle, the drive voltage Vb is supplied from a right-side wheel 11e that is in contact with the rail of the section 1b and the drive voltage Va is supplied from a left-side wheel 11f that is in contact with the rail of the section 1a, respectively. Accordingly, during travel of the vehicle in a distance L1 between the right and left wheels 11e and 11f, superimposition of the two drive voltages Va and Vb is caused. Further, as illustrated in FIG. 2B, in a case of collecting the current with both of bogies included in the vehicle, the drive voltage Vb is supplied from a rightmost wheel 11g that is in contact with the rail of the section 1b, and the drive voltages Va are supplied from the other wheels, respectively. Accordingly, during the travel of the vehicle in a distance L2 between the both-end wheels 11g and 11h of the vehicle, superimposition of the drive voltages Va and Vb is caused. Further, as illustrated in FIG. 2C, in a case of collecting the current with all of bogies of the train, the drive voltage Vb is supplied from a rightmost wheel 11i that is in contact with the rail of the section 1b, and the drive voltages Va are supplied from the other wheels, respectively. Accordingly, during driving of the vehicle in a distance L3 between the wheels 11i and 11j at train ends, superimposition of the drive voltages Va and Vb is caused.

When the drive voltages Va and Vb are superimposed at the vehicle side, a phenomenon of rapid acceleration of the vehicle may be caused against the instruction of the control device 5. For example, in a case where the drive voltage Vb of the section 1b having the same duty ratio as the drive voltage Va of the section 1a is temporally delayed from the drive voltage Va, as illustrated by the broken line of FIG. 4, the duty ratio of the pulse waveform of the voltage superimposed at the vehicle side (superimposed voltage) becomes large by the delay of the drive voltage Vb. Accordingly, an effective voltage defined as an integrated value of the pulse becomes high, and the rapid acceleration of the vehicle is caused. As a worst case, if the drive voltages Va and Vb having the duty ratio of 50% are shifted by ½ of the modulation period, the duty ratio of the superimposed voltage becomes 100%, and thus a case where the vehicle, which has been traveling at a middle speed, suddenly begins to accelerate at full power is caused. Such unintended rapid acceleration may be caused not only in a case where the vehicle travels at a constant vehicle speed, but also in all of traveling states other than stopping, including states in the middle of acceleration and deceleration.

The reason to cause the unintended rapid acceleration is that the phases of the pulse width modulation are not aligned in the adjacent sections 1a and 1b. Therefore, in the present embodiment, the reset signal RS is supplied to all of the feeding devices 6, and the phases of the internal clocks CLin counted by the pulse width modulation counters 6d between the feeding devices, and the count values are corrected. Accordingly, the phases of the pulse width modulation are aligned between the feeding devices 6, and thus even if the plurality of drive voltages is superimposed at the vehicle side when the vehicle crosses the sections, change of the duty ratio due to the phase shift is not caused. As a result, the unintended rapid acceleration of the vehicle can be effectively suppressed.

FIGS. 5A to 5D are explanatory diagrams of vehicle control by the control system 4 using the vehicle A as an object to be controlled. The control device 5 that serves as the core of the control system 4 recognizes the positions of the vehicles A and B on the layout 1 on a section basis, based on sensor signals from position sensors 3a to 3c. Then, the control device 5 individually instructs the two feeding devices 6 that feed the power to the sections 1a and 1b to have a target duty ratio (vehicle speed). To be specific, when entry of the vehicle A to the section 1a has been detected based on the sensor signal from the position sensor 3a, and the vehicle A continuously travels toward the next section 1b, whether the preceding vehicle B exists in the next section 1b is determined. This determination is performed based on the sensor signals from the position sensors 3b and 3c. For example, when passage (entry) of the vehicle has been detected by the position sensor 3b, and then passage (exit) of the vehicle has been detected by the position sensor 3c, it can be determined that no vehicle exists in the section 1b.

Figure 5A:
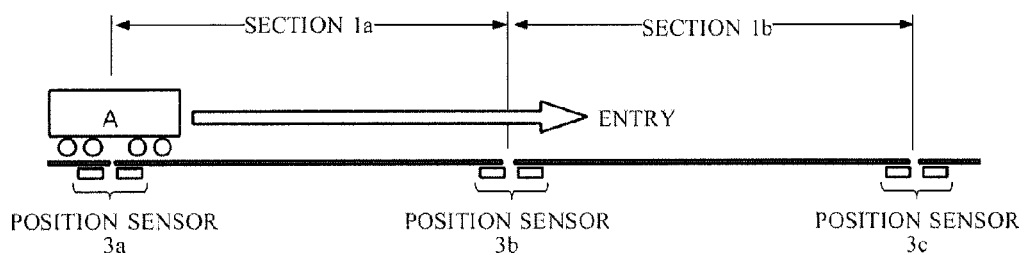
FIG. 5A is an explanatory diagram of vehicle traveling control by a control system.

When it has been determined that no vehicle exists in the section 1b, entry of the vehicle A to the next section 1b is allowed, as illustrated in FIG. 5A. The two feeding devices 6 that feed the power to the sections 1a and 1b individually supply the drive voltages having the same duty ratio according to the instruction from the control device 5 as the higher-level device. The phases of the pulse width modulation are matched between the sections 1a and 1b based on the reset signal RS supplied from the interface device 10 as the synchronization signal. Therefore, the vehicle A smoothly moves from the section 1a toward the section 1b without rapid acceleration.

Figure 5B:
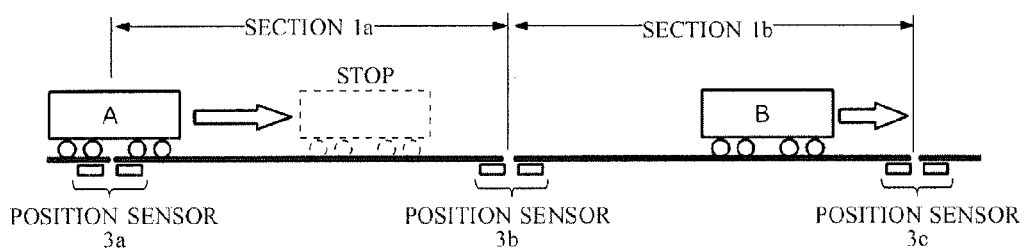
FIG. 5B is an explanatory diagram of vehicle traveling control by the control system.
Figure 5C:
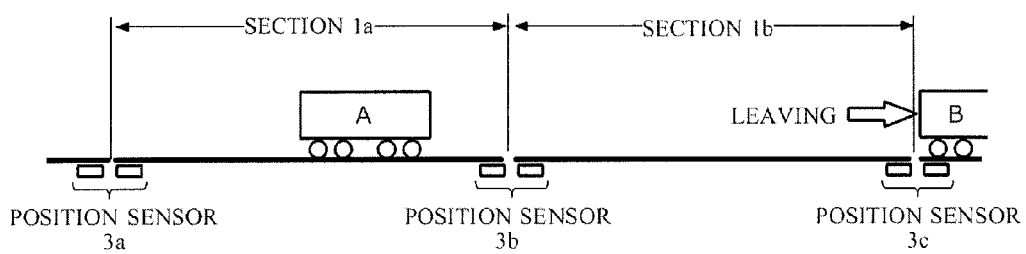
FIG. 5C is an explanatory diagram of vehicle traveling control by the control system.
Figure 5D:
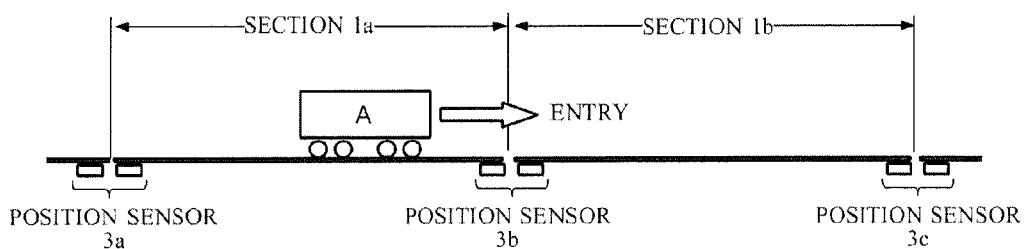
FIG. 5D is an explanatory diagram of vehicle traveling control by the control system.

Meanwhile, when it has been determined that the preceding vehicle B exists in the section 1b, entry of the vehicle A to the next section 1b is not allowed to avoid collision of the vehicles A and B, as illustrated in FIG. 5B. In this case, the preceding vehicle B in the section 1b is caused to continuously travel while the vehicle A is decelerated and stopped in the section 1a. The two feeding devices 6 that feed the power to the sections 1a and 1b individually supply mutually different drive voltages for the vehicles A and B according to the instruction from the control device 5. The stopping of the vehicle A is continued until the preceding vehicle B exits from the section 1b. Then, as illustrated in FIG. 5C, when it has been determined that the preceding vehicle B has exited from the section 1b based on the sensor signal from the position sensor 3c, entry of the vehicle A to the section 1b is allowed, as illustrated in FIG. 5D. The two feeding devices 6 that feed the power to the sections 1a and 1b individually supply the drive voltages having the same duty ratio according to the instruction from the control device 5. Since the phases of the pulse width modulation are matched between the sections 1a and 1b based on the reset signal RS from the interface device 10, the vehicle A smoothly moves from the section 1a toward the section 1b without rapid acceleration. The above control is performed not only for the vehicle that is automatically operated, but also for the vehicle that is manually operated, like the case where the vehicle B that is automatically operated exists ahead of the vehicle A that is manually operated.

As described above, by performing exclusive control of not allowing a plurality of vehicles to enter the section where the vehicle next enters (hereinafter, the control is referred to as "section block control"), that is, by performing control used to resemble a signal security system called "block (block system)" in an actual railway, advantages below can be obtained. First, even how to cause the plurality of vehicles to travel, collision of the vehicles can be avoided in advance by automatically stopping the vehicles when it becomes a state where the collision of the vehicles is about to happen. Second, in a case of causing the plurality of vehicles to automatically travel, it is not necessary to consider a temporal margin not to cause the vehicles to collide. Therefore, a burden to write an operation program is substantially reduced. Even in a case where the operation program is written such that the vehicle A collides with the preceding vehicle B, such situation is avoided in advance by the section block control performed in real time. Third, the vehicle by the manual operation can intervene without collapsing the automatic travel set in advance. For example, assume that, in an automatic operation program, the vehicle A is set to pass the section 1a at a constant speed, as a travel pattern of the vehicle A. Under this setting, in a case where the vehicle B intervenes by the manual operation, the vehicle A is stopped in the section 1a until the vehicle B exits from the section 1b by the section block control performed in real time regardless of the travel pattern set in advance. Accordingly, the vehicle A that is automatically operated travels while avoiding collision with the vehicle B that is manually operated. Therefore, the user can enjoy the travel of the vehicle B by the manual operation without any constraint. Especially, a traffic light is installed in each section, and lighting control of the traffic light is linked with the section block control, so that a more attractive and realistic control system can be realized.

Note that, in the above-described section block control, the vehicle speed control is performed in the relationship with the section that the vehicle enters next. However, this control may be extended and the vehicle speed control may be performed according to a distance including a plurality of sections ahead. For example, the vehicle A is stopped in a case where the vehicle B exists in the next section, the vehicle A is decelerated in a case where the vehicle B exists in the section that is two sections ahead, and the vehicle A is accelerated in a case where the vehicle B is separated in the section that is three sections ahead.

As described above, according to the first embodiment, the internal clocks CLin that are the base clock of the pulse width modulation are internally generated in the feeding devices 6, and the phases of the internal clocks CLin and correction of the count values are adjusted at the input timing of the reset signal RS, so that the phases of the pulse width modulation are synchronized among the plurality of feeding devices 6. Accordingly, the unintended rapid acceleration of the vehicle, which is caused in traveling across the adjacent sections, can be suppressed. In addition, in a case where luminous bodies such as a headlight, a taillight, and an indoor light are mounted on the vehicle, sudden increase in brightness of the luminous bodies can be effectively suppressed.

As described above, according to the first embodiment, the internal clocks CLin that are the base clock of the pulse width modulation are internally generated in the feeding devices 6, and the phases of the internal clocks CLin and correction of the count values are adjusted at the input timing of the reset signal RS, so that the phases of the pulse width modulation are synchronized among the plurality of feeding devices 6. Accordingly, the unintended rapid acceleration of the vehicle, which is caused in traveling across the adjacent sections, can be suppressed.

Further, according to the first embodiment, feed sources are distributed in the plurality of feeding devices 6, the pulse width modulation clocks are internally generated in the respective feeding devices 6, and the drive voltages are supplied/output. Accordingly, the wire amount of the feeding system in the entire layout 1 can be effectively suppressed. In a case where the feed source of the drive voltage is a single source, a large number of wires of the feeding system to all of the sections including a section close to the feed source and a section distant from the feed source need to be pulled out from one place. Therefore, the wire amount of the feeding system becomes very large in the entire layout 1. In contrast, in the present embodiment, the feeding device 6 that is to serve as the feed source is distributed for each section. Therefore, the feeding device 6 can be arranged near the section allocated to the feeding device 6 itself. Accordingly, the wire length of the feeding system that connects the feeding device 6 and the rails can be made short. AS a result, wire work becomes easy for a user who creates the layout, and it is also advantageous in terms of suppression of unnecessary radiation. Further, enlargement the scale of the existing layout 1 can be handled by addition of a new feeding device 6, instead of replacement of feeding units. Therefore, convenience of the user can be enhanced and the extension cost can be suppressed.

Further, according to the first embodiment, the power feed to the layout 1 is performed on a section basis, so that the feeding system is distributed and a power load shared by one feeding system is reduced. Therefore, it is not necessary to make a rated current high, like the DCC, for one feeding device 6. Therefore, risks due to electric shock when carelessly touching the rails or short circuit can be suppressed. Therefore, a highly safe control system can be realized.

Further, according to the first embodiment, the section block control is combined with the distributed feeding system synchronized with the phase of the pulse width modulation, so that realistic section block control without causing unintended rapid acceleration of the vehicle and the like can be realized.

Note that the above-described effect to suppress the unintended rapid acceleration of the vehicle is not based on the section block control and can be widely exerted in section-divided feed using pulse width modulation. Therefore, the feeding device 6 according to the present embodiment can be widely applied to such general section-divided feed. The same applies to embodiments described below.

Second Embodiment

A second embodiment stops using a reset signal RS used in the first embodiment, and aligns a phase of pulse width modulation using serial data D commonly supplied from a higher-level device to lower-level devices (a plurality of feeding devices 6 and a drive device 7) instead.

Figure 6:
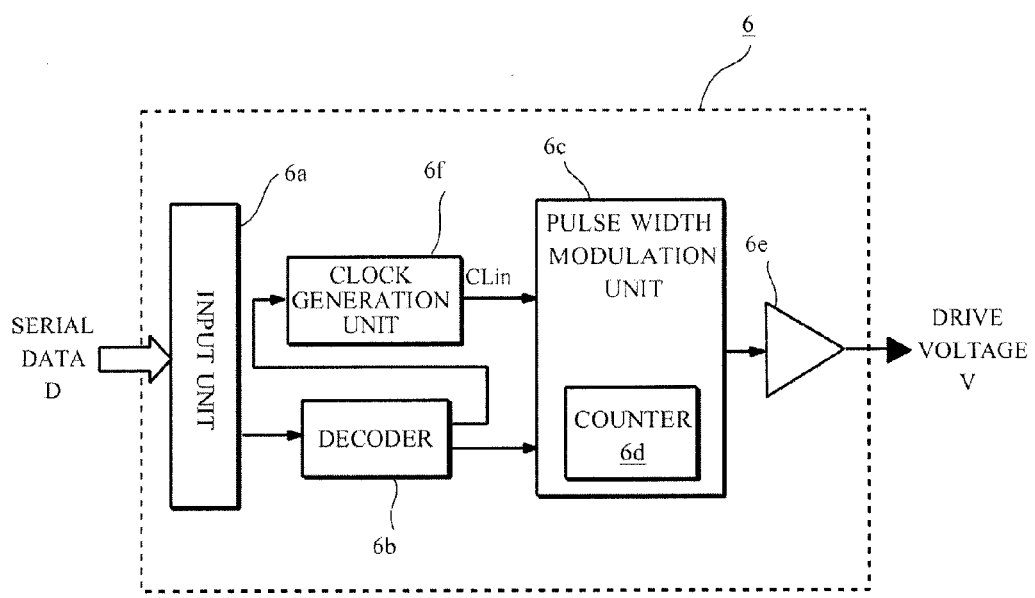
FIG. 6 is a block configuration diagram of a feeding device according to a second embodiment.

FIG. 6 is a block configuration diagram of the feeding device 6 according to the second embodiment. This feeding device 6 includes an input unit 6a, a decoder 6b, a pulse width modulation unit 6c including a pulse width modulation counter 6d, a driver 6e, and a clock generation unit 6f, similarly to the feeding device 6 according to the first embodiment. The clock generation unit 6f generates an internal clock CLin. This internal clock CLin has a phase of the clock aligned with another feeding device 6 at input timing of the serial data D. The pulse width modulation unit 6c counts the internal clock CLin with the counter 6d, and sets a duty ratio of a drive voltage V based on the count value. Other points are similar to the configuration of FIG. 3, and thus the same signs are denoted and description here is omitted.

Figure 7:
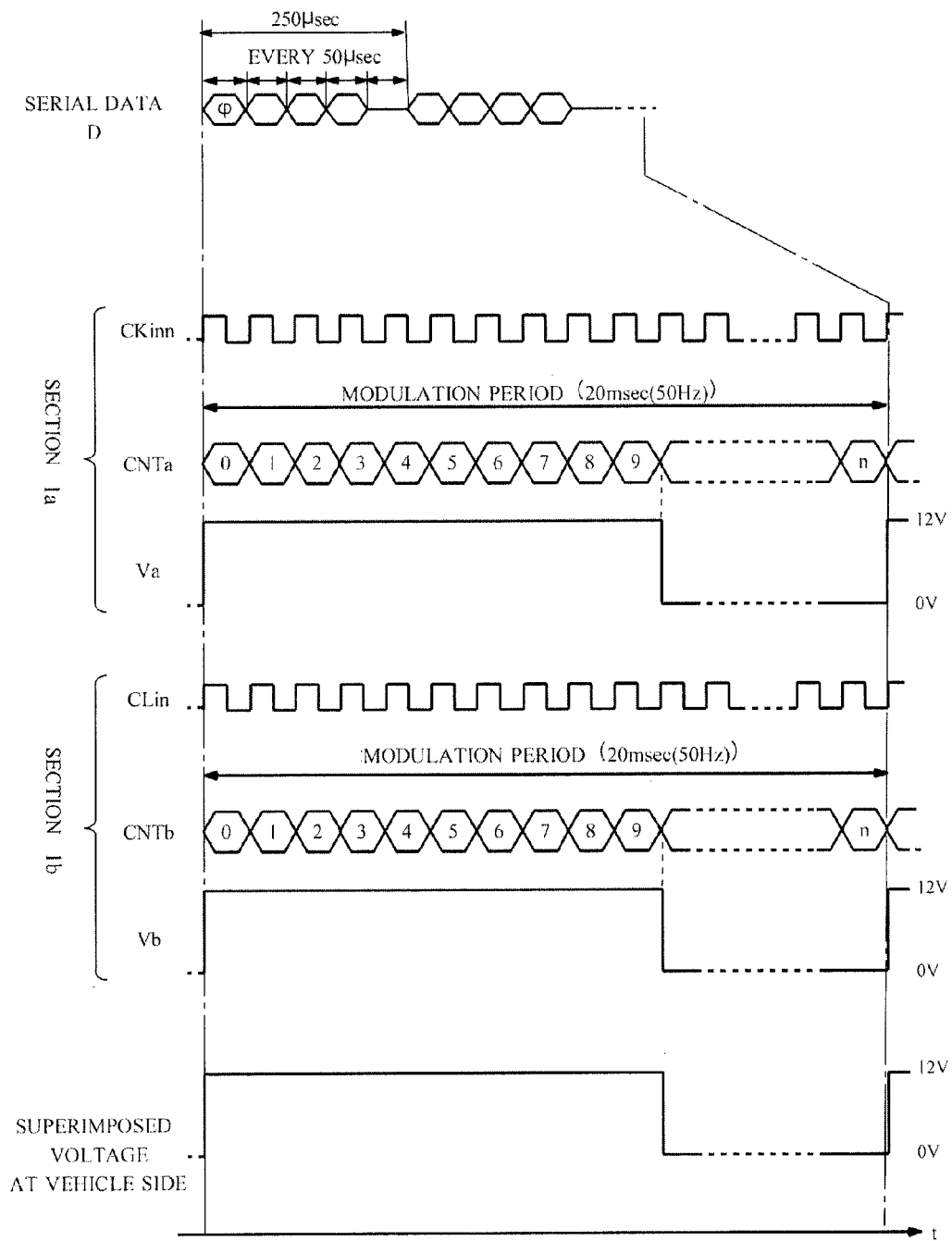
FIG. 7 is an operation timing diagram of pulse width modulation according to the second embodiment.

FIG. 7 is an operation timing diagram of pulse width modulation according to the second embodiment. Count values CNTa and CNTb of the counters 6d are sequentially incremented every time the internal clock CLin rises, starting from "0" (start of a modulation period). A pulse is set ON until the count values CNTa and CNTb reach a target count value (for example, "9"), and is switched to OFF at the time when the count values CNTa and CNTb have reached the target count value "9". After that, the state of OFF is continued until the count values reach "n" (end of the modulation period). Accordingly, pulse waveforms having a duty ratio corresponding to the target count value "9" are generated/output as drive voltages Va and Vb, to which the pulse width modulation has been applied. The above operation is repeated in each modulation period.

Two counters 6d of the sections 1a and 1b count the internal clocks CLin generated in the respective feeding devices 6 independently of each other, and phases of the internal clocks CLin are aligned at input timing of the serial data D. In the present embodiment, as an example of the serial data D, one significant data is configured from four packets transferred in every 50 µseconds. Then, a blank period of 50 µseconds is provided between the serial data D and the serial data D that are before and after in time series to distinguish these serial data D. Accordingly, a total of 250 µseconds including the transfer periods of four packets (50 µseconds×4) and one blank period (50 µseconds) becomes one data transfer period. Further, the modulation period of the pulse width modulation is 20 mseconds (50 Hz), as an example.

In a case of aligning the internal clocks CLin, a unique address φ that indicates that the serial data D is addressed to all of the feeding devices 6 is used as an address attached to the serial data D. Further, a correction value (for example, "0") of the counter 6d is specified by the serial data D to which the unique address φ is attached. The decoder 6b that analyzes the serial data D aligns the internal clock CLin at input timing of a head packet that configures the serial data D in a case where the address attached to the serial data D is φ. Accordingly, the timing to increment the count values CNTa and CNTb is matched. Therefore, the phases of the pulse width modulation are aligned. In addition, the decoders 6b correct the count values CNTa and CNTb of the counters 6d to the value "0" specified by the serial data Dat the same time. Accordingly, even if the count values CNTa and CNTb become different values due to disturbance such as noises, the values can be corrected. As a result, the temporally matched drive voltages Va and Vb are supplied to the sections 1a and 1b without causing phase shift of the pulse width modulation.

As described above, according to the second embodiment, an effect similar to the first embodiment is exerted, and the signal supplied from the higher-level device to the feeding device 6 is basically only the serial data D (a reset signal RS is unnecessary). Therefore, it is not necessary to provide new wires and there is also an effect to simplify a signal transmission system between the feeding device 6 and the serial data D. Especially, in a case where the higher-level device and a plurality of feeding devices 6 are cascade-connected, a wire amount of the feeding system can have significant decrease effect.

Note that, in the second embodiment, the feeding device 6 of each section may check the transfer period of the serial data D supplied from the higher-level device or instruction content (command) of the serial data D, request the higher-level device to retransfer the command at the time of wrong transfer, or interpolate a synchronization signal. Accordingly, even when communication disturbance is caused between the higher-level device and the feeding device, the feeding device can effectively handle the communication disturbance.

Note that, in the second embodiment, the reason to use the unique address φ is to secure the degree of freedom including the frequency of adjustment by explicitly specifying adjustment timing to align the phases of the pulse width modulation at the higher-level device side. However, in terms of simply performing the phase adjustment of the pulse width modulation without considering such a degree of freedom, it is not necessary to use the unique address φ, and the phases of the internal clocks CLin may be aligned every time the serial data D to which a normal address is attached is input. Further, in a case of using the serial data D to which the unique address φ is attached, it is favorable to frequently supply the serial data D. However, the interval of the supply is not necessarily constant, and may be irregular.

Third Embodiment

A third embodiment is characterized in that luminous bodies (a headlight, a taillight, an indoor light, and the like) mounted on a vehicle are lighted on a steady basis (that is, the luminous bodies are lighted even at the time of stopping of the vehicle or at the time of very low speed traveling) by further superimposing a high-frequency pulse on a pulse, to which the pulse width modulation described in the above embodiments has been applied. A configuration of a feeding device 6 is basically the same as those illustrated in FIGS. 3 and 6.

Figure 8:
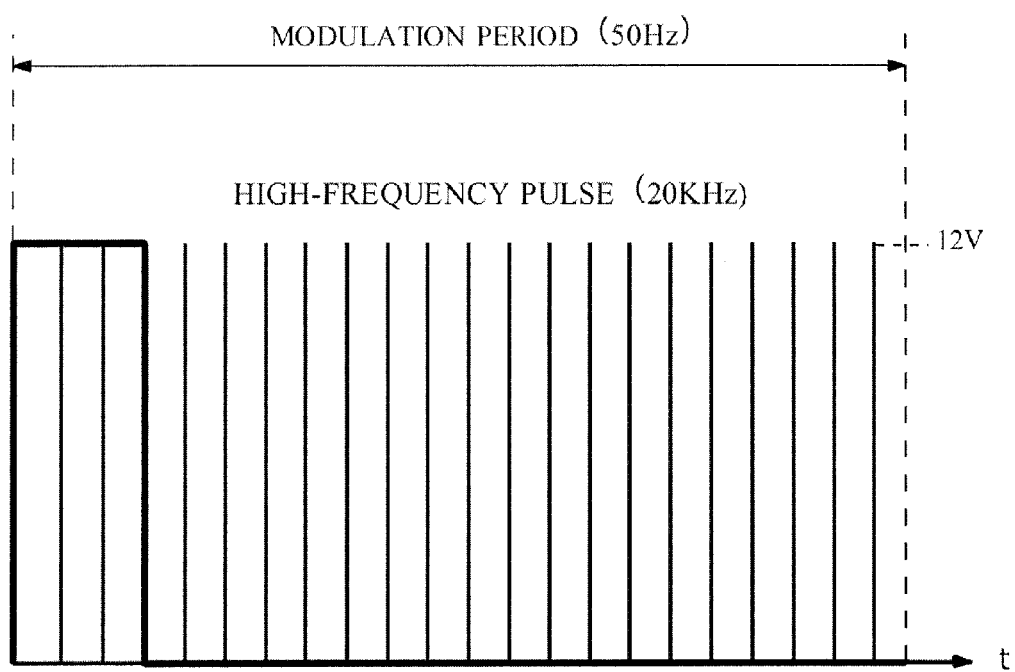
FIG. 8 is a diagram illustrating a pulse waveform of a drive voltage, on which a high-frequency pulse for steady lighting according to a third embodiment is superimposed.

FIG. 8 is a diagram illustrating a pulse waveform of a drive voltage to which a high-frequency pulse for steady lighting according to the third embodiment is superimposed. As described above, a modulation period of pulse width modulation is set to 50 Hz, as an example. When an instruction to light the luminous bodies mounted on the vehicle on a steady basis is received from a control device 5, a pulse width modulation unit 6c evenly superimposes the high-frequency pulse of 20 KHz on the pulse, to which the pulse width modulation has been applied (no superimposition is performed when no instruction is given). Further, similarly to the above-described embodiments, phase alignment of the high-frequency pulse is performed at input timing of serial data D (head packet). However, the phase alignment may be performed every input timing of a packet transferred in every 50 µseconds Matching of the phase of the high-frequency pulse can be more strictly ensured by increasing the frequency of the phase alignment.

Typically, while a luminous body such as an LED instantly reacts to change of a voltage, a motor takes a more time than the luminous body. Therefore, if a pulse having a frequency that is high enough not to allow the motor mounted on the vehicle to move is superimposed, only the luminous body can be lighted without driving the motor. Note that the high-frequency pulse to be superimposed can also be used to operate a function to clean rails in a cleaning car, other than the use for steady lighting. Further, the high-frequency pulse can be used as a power source for operating a fuming device (a steam locomotive or the like) mounted on the vehicle, a sound generation device, a camera, and the like, or may be used as a command therefor.

Note that the high-frequency pulse used for steady lighting or the like is generated in an inside of each of the feeding devices 6 from the perspective of suppression of noises. This is because, when supplying such a high-frequency pulse from the control device 5 to each of the feeding devices 6, a supply path thereof becomes a large noise source. As a specific generation technique, the high-frequency pulse may be generated by separately generating a base clock having a higher frequency than an internal clock CLin from the internal clock CLin in a clock generation unit 6*f*, and counting the base clock with a counter 6*d*. Further, the base clock may be commonly used in both of the pulse width modulation and generation of the high-frequency pulse. In this case, the width of the high-frequency pulse is suppressed by counting the high-frequency base clock using a lower counter. In addition, the width of the pulse width modulation is suppressed using a higher counter incremented by carry of the lower counter.

As described above, according to the third embodiment, the luminous bodies can be lighted on a steady basis at the time of stopping of the vehicle and at the time of very low speed traveling, while the effects of the above-described embodiments are exerted.

Note that, in the above-described embodiments, only the phase alignment of the internal clocks CLin may be performed without performing correction of the count values themselves as long as it can be secured that shift is not caused in the values of the counters 6*d* in the system.

Further, in the above-described embodiments, application examples to a railway model have been described. However, the present invention is not limited to the examples, and can be widely applied to various types of model vehicles. Any model vehicle can be employed as long as the model vehicle collects a current from a feeding path such as a rail and travels by itself, and one that collects the current with a current-collecting shoe instead of wheels may be employed.

What is claimed is:

1. A distributed feeding device of a model vehicle that provides each of a plurality of electrically separated sections in a layout, and that is configured to feed power to the model vehicle traveling on the layout on a section basis comprising:
    a clock generation unit configured to generate an internal clock having a phase of the internal clock aligned with a phase of a clock of another feeding device based on a synchronization signal supplied from a higher-level device, the synchronization signal being commonly supplied to the another feeding device;
    a pulse width modulation unit configured to set a pulse having a duty ratio according to an instruction from the higher-level device based on a count value obtained by counting the internal clock generated in the clock generation unit; and
    a driver configured to supply a pulsed drive voltage having the duty ratio set by the pulse width modulation unit to a section, allocated to the driver, of plurality of electrically seperated sections.

2. The distributed feeding device of the model vehicle according to claim 1, wherein
    the clock generation unit adjusts the phase of the internal clock based on an input timing of the synchronization signal.

3. The distributed feeding device of the model vehicle according to claim 2, wherein
    the pulse width modulation unit corrects the count value to a predetermined value based on the input timing of the synchronization signal.

4. The distributed feeding device of the model vehicle according to claim 1, wherein
    the synchronization signal is serial data periodically supplied from the higher-level device.

5. The distributed feeding device of the model vehicle according to claim 4, wherein
    the clock generation unit adjusts the phase of the internal clock based on an input timing of the serial data when a unique address indicating the serial data is addressed to the plurality of feeding devices is attached to the serial data supplied from the higher-level device.

6. The distributed feeding device of the model vehicle according to claim 5, wherein
    the pulse width modulation unit corrects the count value to a value specified by the serial data when the unique address is attached to the serial data supplied from the higher-level device.

7. The distributed feeding device of the model vehicle according to claim 1, wherein
    the pulse width modulation unit superimposes, on the pulse, a high-frequency pulse having a frequency higher than a driving frequency of a motor mounted on the model vehicle to move, according to an instruction from the higher-level device.

8. The distributed feeding device of the model vehicle according to claim 7 wherein
    the high-frequency pulse is internally generated by the clock generation unit, and a phase of the high-frequency pulse is aligned with a phase of a high-frequency pulse of the another feeding device based on the synchronization signal.

* * * * *